(12) United States Patent
Kato et al.

(10) Patent No.: US 11,093,183 B2
(45) Date of Patent: Aug. 17, 2021

(54) INFORMATION PROCESSING APPARATUS, CONTROL METHOD OF INFORMATION PROCESSING APPARATUS, AND PROGRAM

(71) Applicant: BROTHER KOGYO KABUSHIKI KAISHA, Nagoya (JP)

(72) Inventors: Nao Kato, Atsugi (JP); Masaki Ohtake, Handa (JP); Hajime Usami, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/832,009

(22) Filed: Mar. 27, 2020

(65) Prior Publication Data

US 2020/0310705 A1 Oct. 1, 2020

(30) Foreign Application Priority Data

Mar. 29, 2019 (JP) .............................. JP2019-065501

(51) Int. Cl.
*G06F 3/12* (2006.01)
*H02J 7/00* (2006.01)
*H04L 12/40* (2006.01)

(52) U.S. Cl.
CPC .......... *G06F 3/1217* (2013.01); *G06F 3/1221* (2013.01); *H02J 7/0063* (2013.01); *H04L 12/40045* (2013.01); *G06F 3/128* (2013.01)

(58) Field of Classification Search
None
See application file for complete search history.

(56) References Cited

U.S. PATENT DOCUMENTS

| 5,532,524 A * | 7/1996 | Townsley .................. G06F 1/26 307/64 |
| 2012/0092714 A1* | 4/2012 | Suzuki .................. G06F 3/1212 358/1.15 |
| 2018/0285038 A1* | 10/2018 | Shimamura ........... G06F 1/3228 |
| 2019/0238705 A1* | 8/2019 | Shimamura ............... G06F 1/28 |
| 2020/0241618 A1* | 7/2020 | Ohtake ................... H02J 50/80 |

FOREIGN PATENT DOCUMENTS

JP H11-252489 A 9/1999

OTHER PUBLICATIONS

Shinkawa Katsuhito, Image Printing System, Minolta Co Ltd, Machine Translation of JP 11_252_489_A, pp. 1-15, Sep. 17, 1999 (Year: 1999).*

* cited by examiner

*Primary Examiner* — Dov Popovici
(74) *Attorney, Agent, or Firm* — Scully, Scott, Murphy & Presser, PC

(57) ABSTRACT

An information processing apparatus includes an interface, a first load device, a battery, a controller, and a plurality of power transmission paths including first to third power transmission paths, wherein the controller is configured to start up the controller with power having a first power amount from an external device via the interface, request a second power amount greater than the first power amount to the external device, determine whether it is possible to receive power supply of the second power amount from the external device, supply power to the first load device via the second power transmission path to start up the first load device, and supply the power to the battery via the third power transmission path.

20 Claims, 5 Drawing Sheets

FIG. 5
| FIRST STARTUP POWER AMOUNT SW1 | SECOND STARTUP POWER AMOUNT SW2 | SUPPLIABLE POWER (COMBINATION OF POWER) |
|---|---|---|
| 25W | 5W | 5W (5V、1A) |
| | | 7.5W (5V、1.5A) |
| | | 25W (5V、5A) |
| | | 35W (7V、5A) |
FIG. 6
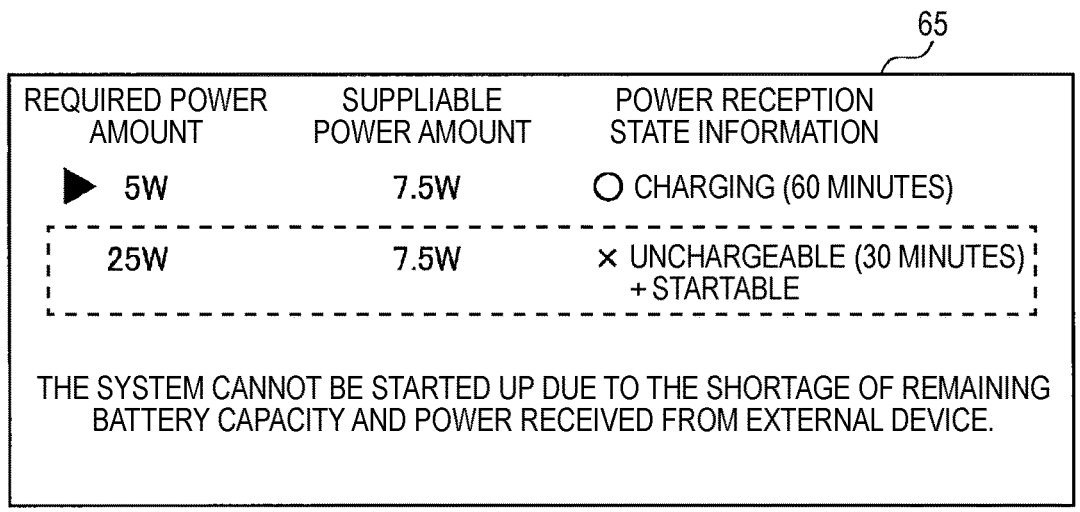
FIG. 7
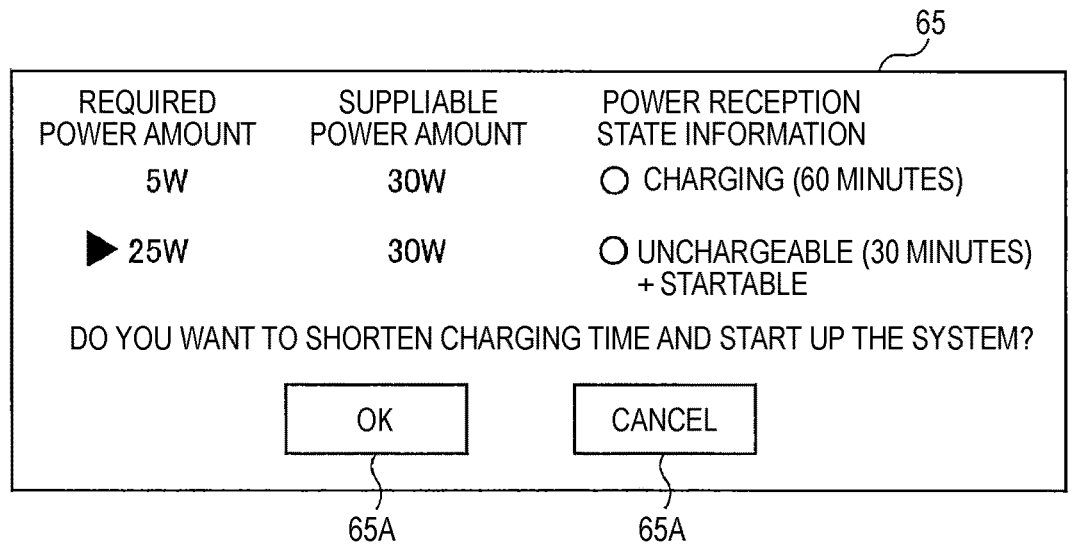

INFORMATION PROCESSING APPARATUS, CONTROL METHOD OF INFORMATION PROCESSING APPARATUS, AND PROGRAM

CROSS REFERENCE TO RELATED APPLICATIONS

This application is based on Japanese Patent Applications No. 2019-065501 filed on Mar. 29, 2019, the entire contents of which are incorporated herein by reference.

TECHNICAL FIELD

The present disclosure relates to an information processing apparatus that receives power via an interface, a control method for the information processing apparatus, and a program.

BACKGROUND

In the related art, for example, various technologies related to an information processing apparatus that receives power by connection conforming to the universal serial bus (USB) standard have been proposed. For example, the digital camera disclosed in JP-A-1999-252489 is connected to a printer connected to an AC power source with a USB cable and receives power from the AC power source via the USB cable and the printer.

In an information processing apparatus that receives power from an external device such as the digital camera described above, the power received from the external device is supplied to each device such as a controller, a battery, and a load device provided in the information processing apparatus. The load device referred to here is various devices that are driven by power, which are provided in the information processing apparatus such as a display. An information processing apparatus including a battery can drive a controller and a load device by using the internal battery as a drive source even when not connected to an external device or a commercial power source as a power source.

However, in an information processing device that drives a controller or a load device by using a battery as a drive source, when power is received from an external device in a state where the remaining battery capacity is low, it may take time to charge the battery, and the startup of the load device may be delayed. Specifically, a driver circuit that operates the load device, a transformer that generates a voltage required by the load device, and the like may require a larger amount of power than usual to start up the load device. If the power required to start the load device cannot be supplied from the battery to the driver circuit, that is, if there is not enough remaining battery capacity to supply the power required to start up the load device, even if an external device is connected, the load device cannot be started up until the battery is sufficiently charged. As a result, the startup of the load device is delayed.

The present application has been proposed in view of the above problems, and an object there is to provide an information processing apparatus capable of shortening the time to start up a load device when an external device that is a power source is connected to an interface in a state where a remaining capacity of a battery is low, a control method of the information processing apparatus, and a program.

SUMMARY

According to an aspect of the invention, an information processing apparatus includes an interface, a first load device, a battery that is capable of supplying power to the first load device, a controller, and a plurality of power transmission paths that includes a first power transmission path that is configured to connect the interface and the controller without going through the battery, a second power transmission path that is configured to connect the interface and the first load device without going through the battery, and a third power transmission path that is configured to connect the interface and the battery. In the information processing apparatus, the controller is configured to start up the controller with power supplied via the interface and the first power transmission path when receiving power having a first power amount from an external device via the interface, request a second power amount that is greater than the first power amount to the external device via the interface after starting up of the controller, determine whether it is possible to receive power supply of the second power amount from the external device via the interface after requesting the second power amount, in a case where it is determined that it is possible to receive power supply of the second power amount from the external device via the interface in the determination of receiving the power supply, supply power supplied from the external device via the interface to the first load device via the second power transmission path to start up the first load device when power having the second power amount is supplied from the external device via the interface as a result of the request for the second power amount, and in a case where it is not determined that it is possible to receive power supply of the second power amount from the external device via the interface in the determination of receiving the power supply, supply the power supplied from the external device via the interface to the battery via the third power transmission path.

In addition, the content of disclosure of the description can be implemented not only as an information processing apparatus, but also as a control method for controlling the information processing apparatus, and a program executing by a computer controlling the information processing apparatus.

According to the information processing apparatus and the like according to the present application, when power is received from an external device in a state where the battery remaining capacity is low, first, power is supplied to the controller to start up the controller. When the information processing apparatus or the like starts up the controller, the information processing apparatus or the like requests the external device for a second power amount greater than a current first power amount. When the information processing apparatus or the like succeeds in receiving the second power amount, the information processing apparatus or the like starts up a first load device with the power supplied from the external device via the interface. As a result, even if there is not enough remaining battery capacity to supply the power required to start up the first load device, and it takes time to charge the battery when receiving a first power amount, the first load device may be started up early without waiting for the battery to be charged by requesting the external device to increase the amount of power. That is, the startup time of the first load device becomes shorter.

BRIEF DESCRIPTION OF DRAWINGS

FIG. 5 is a diagram illustrating a first startup power amount, a second startup power amount, and an amount of power that can be supplied;

FIG. 6 is a diagram illustrating a display screen of a display device; and

FIG. 7 is a diagram illustrating a display screen of the display device.

DESCRIPTION OF EMBODIMENTS

Hereinafter, a portable printer 10 as an embodiment embodying an information processing apparatus of the present application will be described with reference to FIG. 1.

(1. Configuration of Portable Printer)

Figure 1:
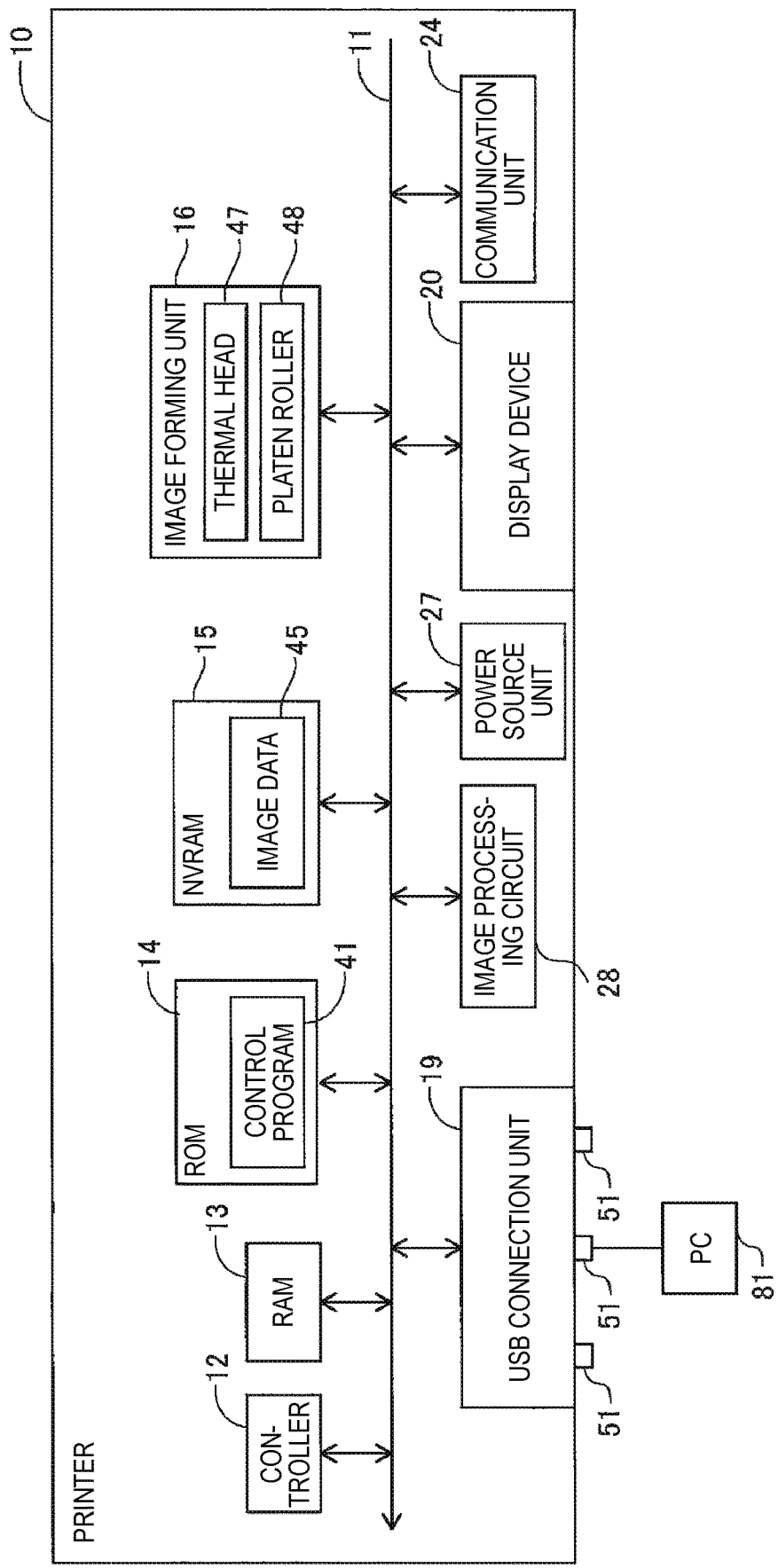
FIG. 1 is a block diagram of a printer according to the present embodiment.

FIG. 1 illustrates an electrical configuration of the portable printer 10 of the present embodiment. The printer 10 is a portable printing apparatus that can be carried, for example, and prints image data of a print job received via wired communication or wireless communication with a PC or a smartphone on a predetermined sheet (such as thermal paper). The printer 10 includes a controller 12, a RAM 13, a ROM 14, an NVRAM 15, an image forming unit 16, a USB connection unit 19, a display device 20, a communication unit 24, a power source unit 27, an image processing circuit 28, and the like. The controller 12 and the like are connected to each other via a bus 11.

The ROM 14 is a nonvolatile memory such as a flash memory, for example, and stores various programs such as a control program 41. For example, the controller 12 includes a processing circuit such as a CPU and executes the control program 41 read from the ROM 14 to start up the system of the printer 10. The NVRAM 15 is a nonvolatile memory. The NVRAM 15 stores image data 45 and various setting data. The data storage destination described above is an example. For example, the control program 41 may be stored in the NVRAM 15. The image data 45 may be stored in the RAM 13. A storage unit for storing the control program 41 is not limited to the ROM and may be a flash memory. The storage unit that stores the control program 41 may be a computer-readable storage medium. As a computer-readable storage medium, a recording medium such as a CD-ROM or DVD-ROM may be employed in addition to the above example.

The control program 41 is, for example, firmware that comprehensively controls each unit of the printer 10. The controller 12 executes the control program 41 and controls each unit connected via the bus 11 while temporarily storing the executed processing result in the RAM 13. The image data 45 is, for example, image data of a print job received via wired communication or wireless communication with a PC, a smartphone, or the like. In the following description, the controller 12 that executes the control program 41 may be simply described as the controller 12. For example, the description "the controller 12 switches a first switching unit 62" may mean "the controller 12 executes the control program 41 and controls the first switching unit 62 to switch the first switching unit 62".

The image forming unit 16 includes, for example, a line-type thermal head 47 and prints an image on a sheet by a direct thermal method based on the control of the controller 12. The image forming unit 16 rotates a platen roller 48 provided to face the thermal head 47 and conveys the sheet. For example, when a sheet is inserted into the insertion port of the printer 10 at the start of printing, the inserted sheet is guided to the opposed portion of the platen roller 48 and the thermal head 47 and is discharged from the discharge port after printing is completed.

The USB connection unit 19 is an interface that performs communication and power transfer in conformity with, for example, the USB power delivery (PD) standard. The USB connection unit 19 includes, for example, three receptacles 51 as connectors. The USB connection unit 19 performs data communication and power transfer with various external devices connected to the receptacle 51. The connected external device is, for example, a personal computer (PC) 81 as illustrated in FIG. 1. The external device to be connected is not limited to the PC 81, and various devices that can be connected according to the USB standard, such as a smartphone, a digital camera, and an external hard disk, can be employed.

The receptacle 51 is, for example, a connector that conforms to the USB Type-C standard. Each receptacle 51 includes a plurality of pins for performing data communication and power transfer. For example, the receptacle 51 includes, as a plurality of pins, a TX pin, an RX pin, a D pin, a Vbus, a CC pin, and the like in a USB Type-C standard connector. The receptacle 51 performs data communication by using, for example, any one of the TX pin, the RX pin, and the D pin. The receptacle 51 also supplies power and receives power by using the Vbus pin.

The CC pins are pins used for determining a power role, for example, and are provided with CC1 pins and CC2 pins corresponding to the front and back of the plug connected to the receptacle 51. Each receptacle 51 has a dual role power (DRP) function of switching to a power source that is a power supply source or a power sink that is a power supply destination, as a power role.

Each receptacle 51 functions as a communication device as a communication role in data communication conforming to the USB standard when an external device such as a PC 81 is connected. When an external device is connected to the receptacle 51, the printer 10 is controlled for data communication by, for example, an external device that functions as a communication host.

Figure 2:
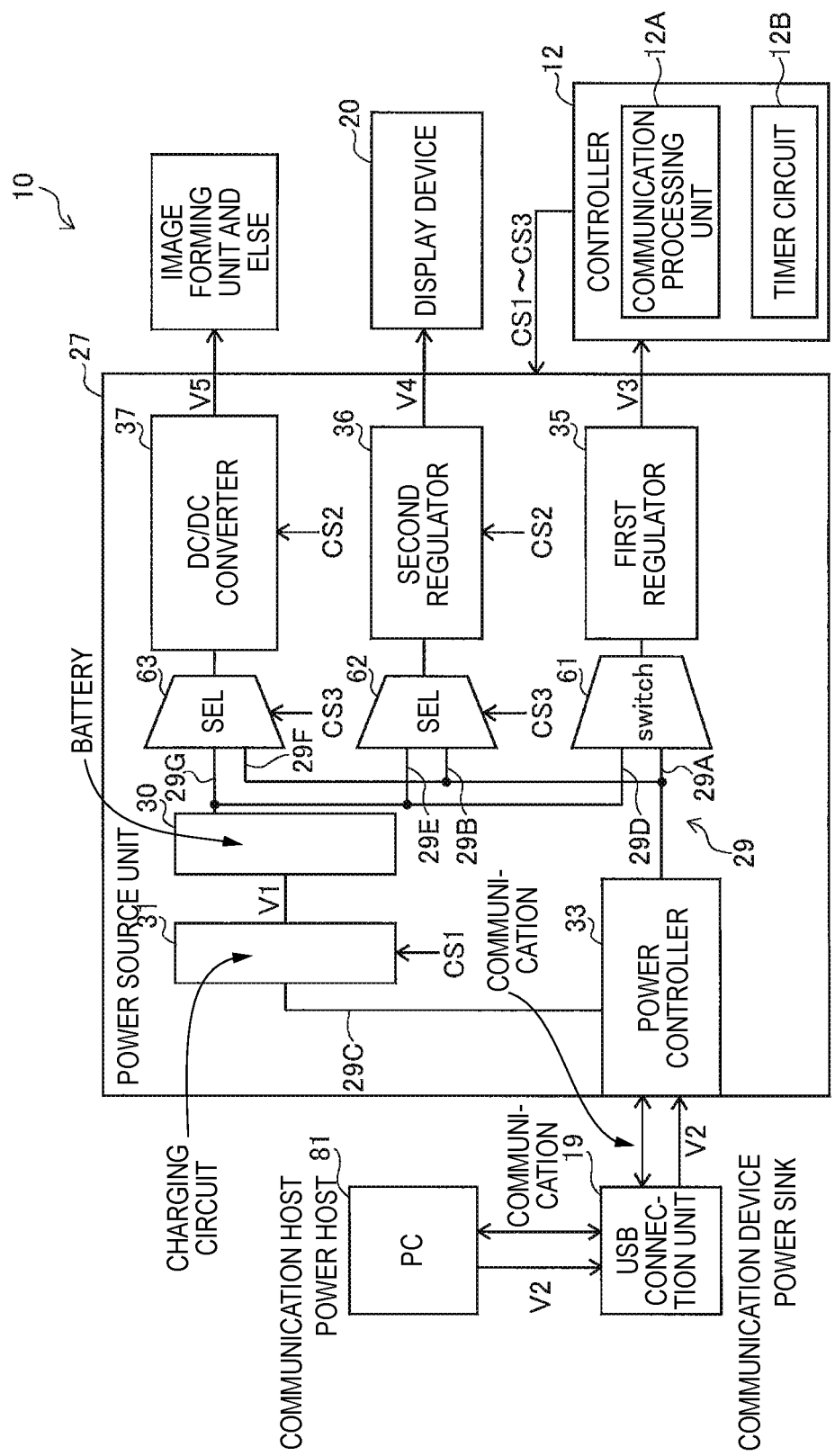
FIG. 2 is a block diagram illustrating a configuration of a power source unit according to the present embodiment.

Next, the configuration of the power source unit 27 will be described. FIG. 2 illustrates the configuration of the power source unit 27. As illustrated in FIG. 2, the power source unit 27 includes a battery 30, a charging circuit 31, a power controller 33, a first regulator 35, a second regulator 36, a DC/DC converter 37, and the like. The power source unit 27 includes a power transmission path 29 that connects each device. The power transmission path 29 includes a first power transmission path 29A to a seventh power transmission path 29G and transmits power to each device.

The battery 30 functions as a power source for each device in the printer 10 and supplies power to each device. The charging circuit 31 is connected to the battery 30 and generates a charging voltage V1 that charges the battery 30. The charging circuit 31 is connected to the power controller 33 via the third power transmission path 29C of the power transmission path 29. The charging circuit 31 is connected to the external device via the third power transmission path 29C, the power controller 33, and the USB connection unit 19 and receives the power of an input voltage V2 from the external device through the USB connection. The charging circuit 31 transforms power of the input voltage V2 received from the external device to generate power of the charging voltage V1 and supplies the generated power of the charging voltage V1 to the battery 30.

The charging circuit 31 can be controlled to start or stop an operation by a control signal CS1 output from the controller 12. For example, the charging circuit 31 starts the operation based on the input of the high-level control signal CS1 and stops the operation based on the input of the low-level control signal CS1. Thus, the controller 12 can switch between starting and stopping charging of the battery 30. The printer 10 may include an AC cord for connecting the power source unit 27 to an external AC power source, an AC/DC circuit, or the like. Here, the power source unit 27 may charge the battery 30 with the power received from the AC power source or may supply power to the controller 12 or the like.

The power controller 33 controls power transfer via the USB connection unit 19. The power controller 33 executes communication related to power transfer with an external device connected to the USB connection unit 19 (receptacle 51). The communication related to power transfer is, for example, communication related to power source information (such as the presence of a battery) of the apparatus or communication related to negotiation of power transfer. The negotiation here is, for example, processing for setting a power role, setting a power amount to be transferred, and the like. The power role is a power source that functions as a supply source that supplies power or a power sink that receives power from the power source. In FIG. 2, the power controller 33 is illustrated as an integral processing block. However, the power controller 33 may separately include a processing block that transfers power via the USB connection unit 19 and a processing block that performs communication related to power transfer via the USB connection unit 19.

The power controller 33 receives a DC input voltage V2 from an external device, for example, by power transfer according to the USB PD standard. The power controller 33 can supply the input voltage V2 received via the USB connection unit 19 to the charging circuit 31, the first regulator 35, the second regulator 36, and the DC/DC converter 37. Therefore, the power source unit 27 can supply a DC voltage from the power controller 33 to the first regulator 35 and the like.

Based on the control of the controller 12, the power source unit 27 can change the amount of power supplied from the power controller 33 to each device. The first regulator 35, the second regulator 36, and the DC/DC converter 37 are transformer circuits that transform the input voltage V2 supplied from the power controller 33 and the voltage supplied from the battery 30, and generate power for the internal power source of the printer 10.

In the first regulator 35, a switch 61 is connected to the input side, and the controller 12 is connected to the output side. The switch 61 is connected to the power controller 33 via the first power transmission path 29A of the power transmission path 29. The switch 61 is connected to the battery 30 via the fourth power transmission path 29D. The switch 61 can switch the connection between the battery 30 and the first regulator 35 via the fourth power transmission path 29D and the connection between the power controller 33 and the first regulator 35 via the first power transmission path 29A. The first regulator 35 is, for example, a linear regulator, transforms the voltage received from the battery 30 or the power controller 33, generates an output voltage V3, and outputs the output voltage V3 to the controller 12. The voltage value of the output voltage V3 is, for example, 3.3 V.

The switch 61 is, for example, an electromagnetic open/close switch, and connects the battery 30 (fourth power transmission path 29D) to the first regulator 35 in a state where power of a predetermined voltage value or more is supplied from the battery 30. The switch 61 connects the power controller 33 (the first power transmission path 29A) to the first regulator 35 in a state where power of the predetermined voltage value or more is not supplied from the battery 30. The predetermined voltage value here is, for example, a rated voltage value for switching on/off of the electromagnetic open/close switch.

For example, the switch 61 automatically connects the power controller 33 and the first regulator 35 when the remaining capacity of the battery 30 is low and power from the battery 30 is not supplied beyond the predetermined voltage value. Accordingly, the switch 61 connects the power controller 33 and the first regulator 35 in a state where the remaining capacity of the battery 30 is empty. The switch 61 connects the battery 30 and the first regulator 35 when the battery 30 is charged, the remaining capacity of the battery 30 is increased, and the battery 30 receives power of a predetermined voltage value or more. The switch 61 is not limited to the configuration in which the connection is switched based on the predetermined voltage value, and may be configured to connect the power controller 33 and the first regulator 35 only when power cannot be received from the battery 30, that is, when the remaining capacity of the battery 30 is empty.

For example, the first regulator 35 automatically starts when detecting that power having a voltage value (rated voltage value) within a desired range has been input, starts generating the output voltage V3, and supplies the output voltage V3 to the controller 12. On the other hand, the second regulator 36 and the DC/DC converter 37 can be started or stopped based on a control signal CS2 input from the controller 12. Therefore, the controller 12 can switch between the start and stop of the transformation operation by the second regulator 36 and the DC/DC converter 37. The first regulator 35 may be configured such that the controller 12 can control the start and stop of the operation.

In the second regulator 36, the first switching unit 62 is connected to the input side, and the display device 20 is connected to the output side. The first switching unit 62 is connected to the power controller 33 via the second power transmission path 29B of the power transmission path 29. The first switching unit 62 is connected to the battery 30 via the fifth power transmission path 29E. The first switching unit 62 can switch the connection between the battery 30 and the second regulator 36 via the fifth power transmission path 29E and the connection between the power controller 33 and the second regulator 36 via the second power transmission path 29B. The first switching unit 62 switches the connection of the second regulator 36 based on the control signal CS3 input from the controller 12. The second regulator 36 transforms the voltage received from the battery 30 or the power controller 33 and generates an output voltage V4 necessary for driving the display device 20. The second regulator 36 supplies the transformed output voltage V4 to the display device 20.

The DC/DC converter 37 has a second switching unit 63 connected to the input side, and a load device (an example of a second load device) other than the display device 20 (an example of a first load device) such as the image forming unit 16, the communication unit 24, and the image processing circuit 28 is connected to the output side. The load device other than the display device 20 here is not limited to the device illustrated in FIG. 1, but may include a device not illustrated in FIG. 1, for example, a microcomputer, various sensors, a motor that drives the thermal head 47 and the platen roller 48, and the like.

The second switching unit 63 is connected to the power controller 33 via the sixth power transmission path 29F of the power transmission path 29. The second switching unit 63 is connected to the battery 30 via the seventh power transmission path 29G. The second switching unit 63 switches the connection between the battery 30 and the DC/DC converter 37 via the seventh power transmission path 29G and the connection between the power controller 33 and the DC/DC converter 37 via the sixth power transmission path 29F. The second switching unit 63 switches the connection of the DC/DC converter 37 based on the control signal CS3 input from the controller 12. The DC/DC converter 37 transforms the voltage received from the battery 30 or the power controller 33 and generates an output voltage V5 necessary for driving the image forming unit 16 and the like. The DC/DC converter 37 supplies the generated output voltage V5 to the image forming unit 16 and the like.

The configuration of the power supply unit 27 illustrated in FIG. 2 is an example. For example, the power supply unit 27 may include three linear regulators or three DC/DC converters. The power supply unit 27 may be configured to include one transformer circuit as a transformer circuit that supplies an output voltage to the display device 20 or the image forming unit 16, or may include three or more transformer circuits that supply output voltages to the display device 20, the image forming unit 16, the image processing circuit 28, and the like.

The device for switching the connection of the power transmission path 29 is not limited to the switching device such as the first switching unit 62 and the second switching unit 63. For example, the second regulator 36 may be connected to the second power transmission path 29B via a first switch and connected to the fifth power transmission path 29E via a second switch. The controller 12 may switch the connection of the second power transmission path 29B and the like to the second regulator 36 by switching on/off of the first and second switches.

The controller 12 includes a plurality of processing units such as a communication processing unit 12A and a timer circuit 12B. The plurality of processing units including the communication processing unit 12A and the timer circuit 12B are processing modules realized by executing the control program 41 by the CPU of the controller 12, for example. The method of realizing the processing of the communication processing unit 12A and the like is not limited to the method of realizing by software processing and may be a method of realizing by hardware processing, for example. The processing of the communication processing unit 12A and the like may be realized by using both software processing and hardware processing.

The communication processing unit 12A is a processing circuit that controls the power controller 33 to execute a negotiation and the like related to the USB PD with an external device. As will be described later, the printer 10 of the present embodiment functions as a communication device in the communication role in the initial stage when an external device is connected to the USB connection unit 19 and receives power of a first power amount W1 from the external device. Here, the first power amount W1 is, for example, the power amount before executing a negotiation according to the USB PD standard, and is the power amount of 2.5 W (5 V, 0.5 A). As will be described later, the printer 10 starts up only the communication processing unit 12A among the processing units of the controller 12 in a state where the remaining battery capacity is empty.

The timer circuit 12B is a circuit for counting time intervals at which a negotiation will be executed when the negotiation by the communication processing unit 12A is periodically executed. The communication processing unit 12A waits for the start of the next negotiation until the count value counted by the timer circuit 12B reaches a predetermined value.

The display device 20 is, for example, a touch panel and includes a liquid crystal panel, a light source such as an LED that emits light from the back side of the liquid crystal panel, a contact sensing film bonded to the surface of the liquid crystal panel and the like. The display device 20 receives an operation on the printer 10 and outputs a signal corresponding to the operation input to the controller 12. The display device 20 displays information related to the printer 10. The display device 20 changes the display content of the liquid crystal panel based on the control of the controller 12.

The display device of the present application is not limited to a touch panel. For example, the display device may be a liquid crystal screen having only a display function. The first load device of the present application is not limited to a device having a display function, and various user interfaces that can perform at least one of providing and receiving information with the user, such as a switch that receives an operation input, a lamp that indicates the state of the printer 10, and a speaker, can be employed.

The communication unit 24 illustrated in FIG. 1 can perform wired communication and wireless communication. The controller 12 controls the communication unit 24 and receives a print job (such as image data 45) via wired communication or wireless communication. The controller 12 may receive a print job through data communication of the USB connection unit 19. The controller 12 executes printing by the image forming unit 16 based on the received print job. The image processing circuit 28 is a circuit for processing and developing the image data related to the received print job.

(2. Power control)

Figure 3:
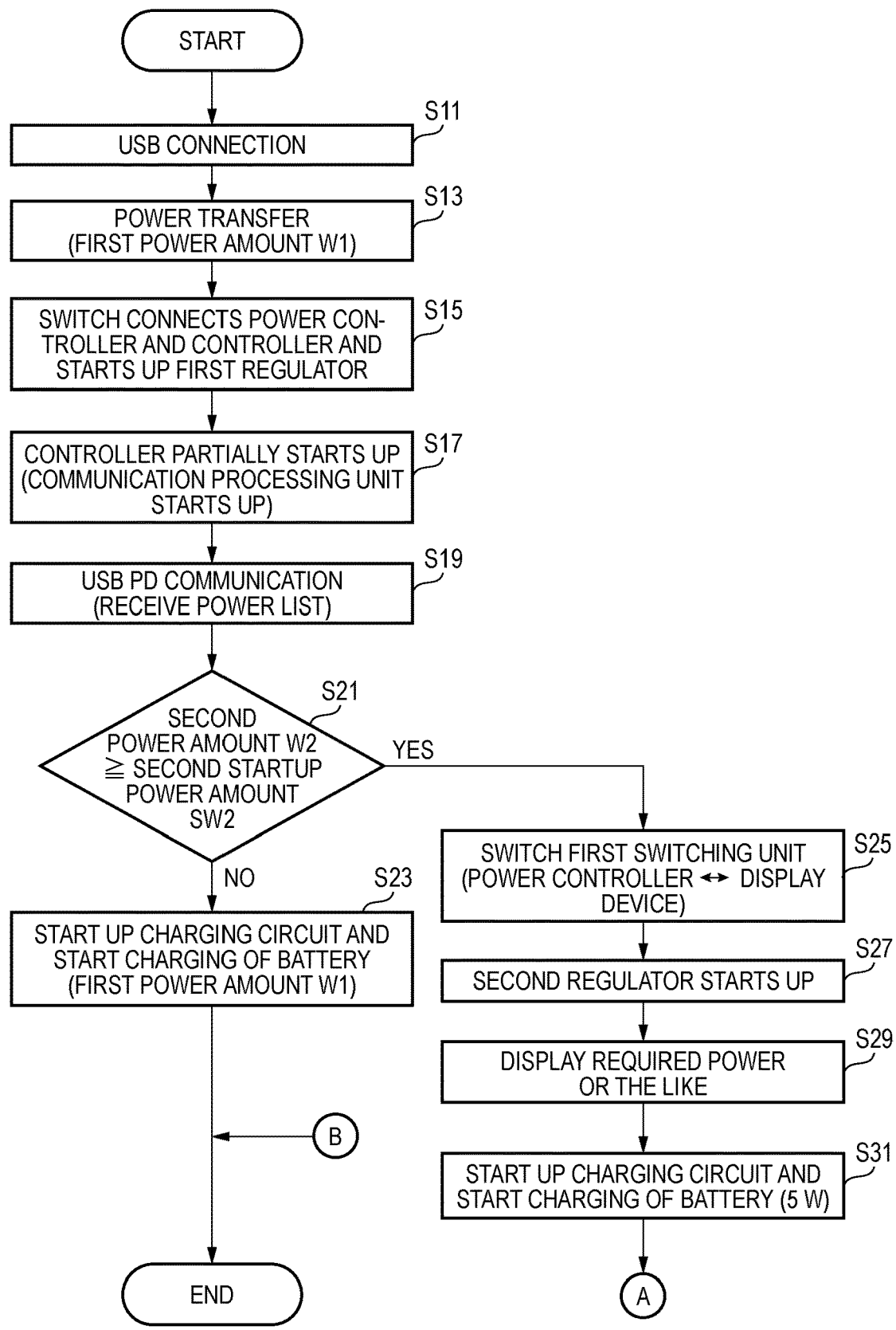
FIG. 3 is a flowchart illustrating power control by the printer.
Figure 4:
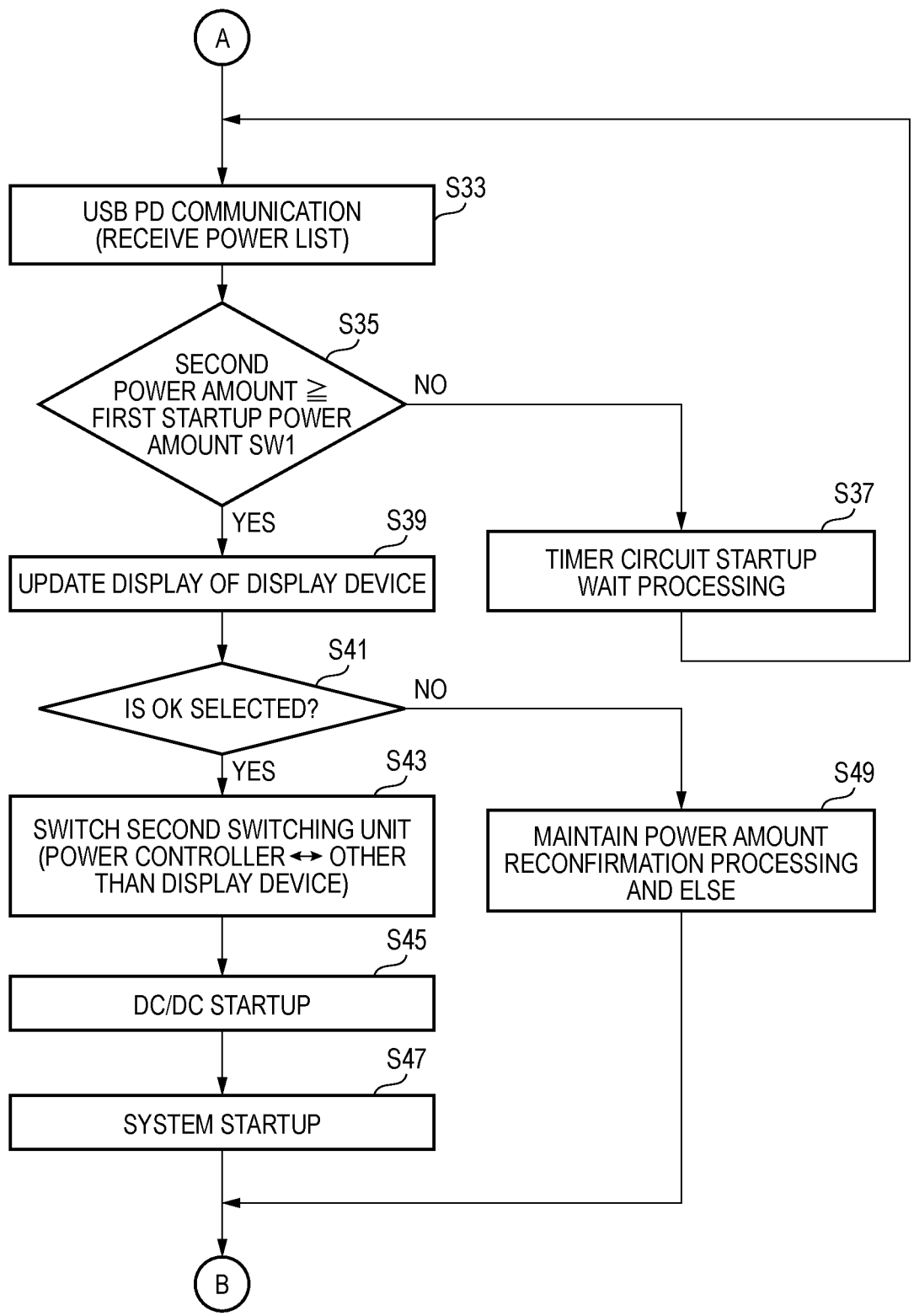
FIG. 4 is a flowchart illustrating power control by the printer.

Next, power control by the printer 10 of the present embodiment will be described with reference to FIGS. 3 and 4. FIGS. 3 and 4 illustrate a flow from when an external device is connected to the printer 10 until the controller 12 starts up all or part of the system of the printer 10. The flowcharts illustrated in FIGS. 3 and 4 include not only processing by the controller 12 (communication processing unit 12A) but also user operations performed on the printer 10 and hardware processing of the printer 10, for convenience of description. More specifically, a step (hereinafter, simply abbreviated as S) 11 illustrated in FIG. 3 is a user operation, and S13 and S15 indicate hardware processing of the printer 10.

In the following description, a case where the PC 81 is connected as an external device will be described. A case where the battery 30 is in an empty state where there is no remaining battery capacity will be described. Accordingly, the battery 30 cannot supply power required to start the first regulator 35, the second regulator 36, the DC/DC converter 37, the controller 12, the display device 20, the image forming unit 16, and the like.

The software processing after S17 basically indicates processing of the communication processing unit 12A of the controller 12 in accordance with instructions described in the control program 41. That is, processing such as "determination", "switching", and "displaying" in the following description represent processing of the communication processing unit 12A. The processing by the communication processing unit 12A includes hardware control. The processing illustrated in S17 and subsequent steps in FIGS. 3 and 4 may be executed by a device other than the communication processing unit 12A. For example, the power controller 33 may execute.

First, in S11 of FIG. 3, the PC 81 is connected to the printer 10 in a state where the remaining battery capacity is empty. The printer 10 operates as a communication device as a communication role and receives power of the first power amount W1 (for example, 2.5 W) from the PC 81 that is a communication host (S13). Since the remaining battery capacity is empty, the switch 61 is not supplied with power from the battery 30 and connects the first regulator 35 to the power controller 33 (first power transmission path 29A) (S15).

The first regulator 35 receives the power of the first power amount W1 from the PC 81 via the USB connection unit 19, the power controller 33, the first power transmission path 29A, and the switch 61 and starts up (S15). The first regulator 35 starts generating the output voltage V3 and supplies the output voltage V3 to the controller 12. Therefore, the first regulator 35 of the present embodiment is a transformer circuit that can be started up with the lowest power that is transferred through a USB connection such as 2.5 W.

When receiving the output voltage V3 from the first regulator 35, the controller 12 executes the control program 41 by the CPU and starts up only the communication processing unit 12A among the plurality of processing units (S17). Accordingly, the communication processing unit 12A is a processing block that can be started up by an output voltage V3 of 3.3 V that can be generated from 2.5 W (input voltage V2 of 5 V). The voltage required to start up the communication processing unit 12A may be a voltage lower than the voltage (for example, 3.3 V) supplied to the controller 12 at a normal state. That is, in S17, the first regulator 35 may supply the controller 12 with a voltage lower than that in the normal state to start up the communication processing unit 12A. The controller 12 may start up a processing unit other than the communication processing unit 12A in S17.

Next, after completing the startup processing started in S17, the communication processing unit 12A controls the power controller 33 to execute a negotiation with the PC 81 (S19). The power controller 33 performs communication according to a method conforming to the USB PD standard and causes the receptacle 51 connected to the PC 81 to function as a power sink for the power role.

Here, for example, in a method conforming to the USB PD standard, power can be received from a power source in a power amount range of 2.5 W (5 V, 0.5 A) to 100 W (20 V, 5 A). For example, the communication processing unit 12A starts negotiations related to power transfer with the PC 81 and receives, from the PC 81, information (power profile information) including a power list of combinations of voltage values and current values that can be supplied within the above-described range of power amount (S19). The communication processing unit 12A determines a combination (hereinafter, may be referred to as "power combination") of voltage value and current value to be requested from the received power list and transmits a power request (request information) requesting the determined combination of power to the PC 81. For example, the communication processing unit 12A determines that the negotiation is successful when receiving a notification (accept information) approved from the PC 81, and receives the desired power from the PC 81 via the Vbus pin. For example, when receiving a rejection notification (reject information) from the PC 81, the communication processing unit 12A determines that the negotiation has failed, and receives power of 2.5 W.

For example, the communication processing unit 12A of the present embodiment determines the required voltage value and current value with reference to the power list based on a first startup power amount SW1 and a second startup power amount SW2. Here, the first startup power amount SW1 is the amount of power required to start all the load devices included in the printer 10. All the load devices are the image forming unit 16 connected to the display device 20 and the DC/DC converter 37, and the like. In the present embodiment, the first startup power amount SW1 is a total power amount of the amount of power required to charge the battery 30, the amount of power required to start up the controller 12, the amount of power required to start up all load devices (display device 20 and the like), and the amount of power required to start up a transformer circuit (such as the second regulator 36) that supplies power to the controller 12 and the load device. The amount of power required to start up the controller 12 is the amount of power required to start up all the processing units including the communication processing unit 12A. Accordingly, the first startup power amount SW1 is the amount of power required to start the system of the printer 10 while charging the battery 30.

The second startup power amount SW2 is a power amount less than the first startup power amount SW1. For example, the second startup power amount SW2 is the amount of power required to start only some of the load devices with high priority among the load devices. The second startup power amount SW2 of the present embodiment is the amount of power required to start the display device 20.

FIG. 5 illustrates an example of the first startup power amount SW1, the second startup power amount SW2, and the suppliable power (a combination of power) that can be supplied by the PC 81. As illustrated in FIG. 5, the first startup power amount SW1 is, for example, 25 W. The second startup power amount SW2 is 5 W. The PC 81 can supply power amounts of 5 W, 7.5 W, 25 W, and 35 W. This suppliable power amount is the amount of power that can be supplied in a state where the PC 81 is not short of power. For this reason, the PC 81 refuses to supply or reduces the amount of power to be supplied according to the power state. Accordingly, when the power list is requested in S19, the PC 81 transmits a combination of power that can be supplied at that time.

After executing S19, the communication processing unit 12A determines whether it is possible to receive power supply of a second power amount W2 that is equal to or greater than the second startup power amount SW2 (S21). Here, the second power amount W2 is the amount of power requested in S19 and is the amount of power received after the request is acknowledged (successfully negotiated). For example, the communication processing unit 12A transmits a power request (request information) for requesting the second power amount W2 that is equal to or greater than the second startup power amount SW2 from the power list in S19. When the communication processing unit 12A receives the rejection notification from the PC 81 as a result of the request, the communication processing unit 12A makes a negative determination in S21 (S21: NO) and executes S23. The determination criterion in S21 is not limited to the above-described rejection notification. For example, the communication processing unit 12A may determine whether there is a combination of power of the second power amount W2 that is equal to or greater than the second startup power amount SW2 in the power list received from the PC 81 (S21). The communication processing unit 12A may make a negative determination in S21 when there is no combination of the power of the second power amount W2 that is equal to or greater than the second startup power amount SW2 in the power list.

When executing S23, the printer 10 maintains a state of receiving 2.5 W of power from the PC 81, for example. In S23, the communication processing unit 12A starts the charging circuit 31. The charging circuit 31 generates the charging voltage V1 based on the power of first power amount W1 and charges the battery 30. Here, since the increase in the amount of power received from the PC 81 has failed, the communication processing unit 12A may execute control for reducing power consumption. For example, the communication processing unit 12A may switch the mode of the controller 12 to a mode in which the power consumption of the CPU or the like is reduced. Specifically, the communication processing unit 12A may stop the clock signal supplied to the processing unit that has not been started up among the processing units included in the controller 12 to suppress power consumption.

After executing S23, the communication processing unit 12A ends the processing illustrated in FIGS. 3 and 4. The printer 10 charges the battery 30 with the first power amount W1 of 2.5 W, and after fully charging the battery 30, starts up the display device 20 and the like. When the communication processing unit 12A detects the connection of a new external device other than the PC 81, the communication processing unit 12A may execute the processing after S19 on the external device and request the power of the second startup power amount SW2 to the external device.

On the other hand, in the power list received from the PC 81 in S19, if there is a combination of the power of the second power amount W2 that is equal to or greater than the second startup power amount SW2, the communication processing unit 12A requests the second power amount W2 of the combination. When the requested second power amount W2 can be received, the communication processing unit 12A makes an positive determination in S21 (S21: YES). As described above, the second startup power amount SW2 of the present embodiment is the amount of power required to start up the display device 20. Therefore, the communication processing unit 12A controls the first switching unit 62 to connect the power controller 33 and the second regulator 36 (S25).

After executing S25, the communication processing unit 12A starts the second regulator 36 (S27). When started, the second regulator 36 receives power from the PC 81 and generates an output voltage V4. The display device 20 receives the output voltage V4 from the second regulator 36 and starts up. When the startup of the display device 20 is detected, the communication processing unit 12A executes processing for displaying the required power on the display device 20 (S29). As a result, even when the remaining battery capacity is low, display on the display device 20 can be performed early by increasing the amount of power supplied from the PC 81.

FIG. 6 illustrates an example of the display screen of the display device 20. As illustrated in FIG. 6, the communication processing unit 12A displays the required power amount, the suppliable power amount, and power reception state information on the display screen 65 of the display device 20. The required power amount here is the amount of power requested to the PC 81 (for example, the second power amount W2). The required amount of power includes not only the amount of power that can be actually requested but also the amount of power that is scheduled to be requested. Specifically, in the present embodiment, the required amount of power is the first startup power amount SW1 and the second startup power amount SW2.

The suppliable power amount is the maximum amount of power that can be supplied by the PC 81. In the example illustrated in FIG. 6, the amount of power that can be supplied by the PC 81 is 7.5 W. Here, the PC 81 is in a power supply state capable of supplying up to 7.5 W of power. Therefore, the communication processing unit 12A can receive the second startup power amount SW2 of 5 W, but cannot receive the first startup power amount SW1 of 25 W. As illustrated by the black triangle in FIG. 6, the communication processing unit 12A displays that the current amount of power received is 5 W. As indicated by a broken line in FIG. 6, the communication processing unit 12A grays out the display field of 25 W that cannot be received. As will be described later, when the communication processing unit 12A determines that the second power amount W2 of 25 W can be received, the communication processing unit 12A updates the display of the display device 20 and stops graying out of the 25 W display field (see FIG. 7).

The power reception state information is information indicating the state of the printer 10 when receiving each required power amount. Specifically, as illustrated in FIG. 6, the communication processing unit 12A displays, as the power reception state information, the charging time required until the battery 30 is fully received when receiving each required power. In the example illustrated in FIG. 6, if the second startup power amount SW2 (5 W) is received in a state where the remaining battery capacity is empty, 60 minutes are required until full charge. When the first startup power amount SW1 (25 W) is received in a state where the remaining battery capacity is empty, the charging time is shortened to 30 minutes. The power reception state information is not limited to the information on the charging time described above. As illustrated in FIG. 6, for example, when receiving the first startup power amount SW1 (25 W), the communication processing unit 12A may display the contents that can start up the system of the printer 10 as the power reception state information. As illustrated at the lower part of the display screen 65, the communication processing unit 12A may display information indicating that the system cannot be started up because the remaining battery capacity and the amount of power to be received are small, as the power reception state information.

After executing S29, the communication processing unit 12A starts up the charging circuit 31 and starts charging the battery 30 (S31). Next, as illustrated in S33 of FIG. 4, the communication processing unit 12A executes a negotiation again with the PC 81 to request a power list (S33). The communication processing unit 12A determines whether there is a combination of power that can receive the second power amount W2 that is equal to or greater than the first startup power amount SW1 from the received power list (S35). When the power list does not contain a combination of power that can receive the second power W2 that is equal to or greater than the first startup power SW1 or when a power request is rejected even though there is a combination of power, the communication processing unit 12A makes a negative determination in S35 and executes S37.

In S37, the communication processing unit 12A starts up the timer circuit 12B and waits for the next processing until the count value counted by the timer circuit 12B reaches a predetermined value, that is, for a predetermined time. The communication processing unit 12A performs the processing from S33 again after executing the standby processing in S37. Therefore, every time the communication processing unit 12A waits for a predetermined time in S37, the communication processing unit 12A repeatedly executes the acquisition of the power list (S33) and the determination processing (S35) based on the acquired power list.

Here, if the communication processing unit 12A increases the amount of power that can be supplied by the PC 81 to 25 W or more by performing the display illustrated in FIG. 6 on the display device 20 in S29 described above, the charging time of the battery 30 can be shortened, and the user can recognize that the system can be started up. As a result, the user removes another USB device (power sink) connected to the PC 81 to increase the amount of power that can be supplied until the display of the display device 20 is changed (until the grayed out display of the 25 W display field disappears). Alternatively, for example, the user performs an operation of increasing the amount of power that can be supplied by connecting a mobile battery to the PC 81. The amount of power that can be supplied may increase due to factors other than the user's work, such as a decrease in the processing load on the PC 81, for example.

Therefore, the predetermined time to wait in S37 is a time interval during which the communication processing unit 12A can appropriately detect that the power state of the PC 81 has changed due to the above-described user work or other factors by repeatedly executing S33 and S35. For example, the predetermined time in S37 is several seconds to several tens of seconds.

On the other hand, in the power list received in S33, if there is a combination of power that can receive the second power amount W2 that is equal to or greater than the first startup power amount SW1, the communication processing unit 12A requests the second power amount W2 of the combination. That is, the communication processing unit 12A requests the PC 81 to increase the supply power amount (second power amount W2). If the requested second power amount W2 can be received, the communication processing unit 12A makes a positive determination in S35 (S35: YES) and updates the display on the display device 20 (S39).

As illustrated in FIG. 7, the communication processing unit 12A stops graying out of the 25 W display field and moves the black triangular mark to the 25 W display field. The communication processing unit 12A displays content (an example of power reception state information) indicating that the charging time can be shortened and that the system can be started up, on the display screen 65. The communication processing unit 12A displays an OK key 65A and a cancel key 65B on the display screen 65.

Next, in S41, the communication processing unit 12A determines whether the OK key 65A on the display screen 65 has been touched. When the communication processing unit 12A detects a touch operation of the OK key 65A (S41: YES), the communication processing unit 12A controls the second switching unit 63 to connect the power controller 33 and the DC/DC converter 37 (S43).

Next, the communication processing unit 12A starts up the DC/DC converter 37 (S45). The DC/DC converter 37 receives power from the PC 81 and supplies the output voltage V5 to the image forming unit 16 and the like. As a result, the load device other than the display device 20 is started up. The controller 12 starts up all processing units other than the communication processing unit 12A (S47). The controller 12 starts up all the processing units, executes initial setting of the image forming unit 16, and starts up the system of the printer 10 (S47). The controller 12 displays a startup screen and an initial screen after startup on the display device 20. As a result, even when the remaining battery capacity is low, the system can be started early by increasing the amount of power supplied from the PC 81.

On the other hand, the communication processing unit 12A makes a negative determination when detecting a touch operation of the cancel key 65B on the display screen 65 in S41 (S41: NO) and power amount maintenance, reconfirmation processing, and the like (S49). For example, similarly to S23, the communication processing unit 12A continues to charge the battery 30 with the second power amount W2 of 5 W while reducing the power consumption of the controller 12. The communication processing unit 12A starts up the DC/DC converter 37 and the image forming unit 16 according to the remaining battery capacity and starts up the system (S49). The communication processing unit 12A may display the display content illustrated in FIG. 7 on the display screen 65 again to confirm the user's intention again.

The printer 10 is an example of an information processing apparatus. The communication processing unit 12A is an example of a processing unit. The USB connection unit 19 is an example of an interface. The display device 20 is an example of a first load device. The PC 81 is an example of an external device. The image forming unit 16, the communication unit 24, the image processing circuit 28, and the like are examples of the second load device. The switch 61 is an example of a switch device.

(3. Effect)

As described above, according to above-described embodiment, there exist the following effects. (1) The controller 12 of the printer 10 of the present embodiment includes the power transmission path 29. The power transmission path 29 includes the first power transmission path 29A for connecting the USB connection unit 19 and the controller 12 without using the battery 30, the second power transmission path 29B for connecting the USB connection unit 19 and the display device 20 without using the battery 30, and the third power transmission path 29C for connecting the USB connection unit 19 and the battery 30. The controller 12 (communication processing unit 12A) executes the processing of S17 (an example of first startup processing) for starting up with power supplied via the USB connection unit 19 and the first power transmission path 29A when receiving the power of the first power amount W1 from the PC 81 via the USB connection unit 19, the processing of S19 for requesting the power of the second power amount W2 that is greater than the first power amount W1 to the PC 81 via the USB connection unit 19 (an example of power request processing) after executing the processing of S17, and the processing of S21 (an example of first determination processing) for determining whether it is possible to receive the power supply of the second power amount W2 from the PC 81 via the USB connection unit 19 after executing the processing of S19. When the controller 12 makes a positive determination in the processing of S21 (S21: YES), and the power of the second power amount W2 is supplied from the PC 81 via the USB connection unit 19 as a result of the processing of S19, the controller 12 executes the processing of S29 (an example of second startup processing) for supplying the power supplied from the PC 81 via the USB connection unit 19 to the display device 20 via the second power transmission path 29B to start up the display device 20. When the controller 12 makes a negative determination in the processing of S21 (S21: NO), the controller executes the processing of S23 (an example of first supply processing) for supplying the power supplied from the PC 81 via the USB connection unit 19 to the battery 30 via the third power transmission path 29C.

According to this, when the printer 10 receives power from the PC 81 in a state where the battery capacity is low, first, the printer 10 supplies power to the controller 12 and starts up the controller 12 (communication processing unit 12A). When started up, the controller 12 requests the PC 81 for a second power amount W2 that is greater than the current first power amount W1. When the controller 12 fails to receive the second power amount W2, the controller 12 charges the battery 30 with the power supplied from the PC 81 via the USB connection unit 19. When the controller 12 succeeds in receiving the second power amount W2, the controller 12 starts up the display device 20 with the power supplied from the PC 81 via the USB connection unit 19. As a result, even if there is not enough remaining battery capacity to supply the power required to start the display device 20, and it takes time to charge the battery 30 in the state of receiving the power of the first power amount W1, the display device 20 can be started up early without waiting for the battery 30 to be charged by requesting the PC 81 to increase the amount of power. For example, when the startup of the display device 20 is delayed, there is no change in the state of the printer 10 even if the PC 81 is connected, the user will not know whether the battery 30 is being charged or the battery 30 has not been charged due to a failure. On the other hand, in the printer 10 of the present embodiment, priority is given to the startup of the display device 20 even when the battery 30 is empty. When the printer 10 is connected to the printer 81, the printer 10 executes a negotiation to start up the display device 20 early. Thus, it is possible to allow the user to recognize that power is normally supplied from the PC 81 by performing display on the display device 20.

(2) The printer 10 further includes the image processing circuit 28 and the image forming unit 16 (an example of the second load device). The controller 12 executes the processing of S35 (an example of first power amount determination processing) for determining whether the second power amount W2 is equal to or greater than the first startup power amount SW1 required to start all of the display device 20, the image forming unit 16, and the like. If the controller 12 determines that the second power amount W2 is equal to or greater than the first startup power amount SW1 by the processing of S35 (S35: YES), the controller 12 starts up all of the display device 20, the image forming unit 16, and the like (S47).

According to this, when it is possible to receive power that is equal to or greater than the first startup power amount SW1 that can start up all load devices including the image forming unit 16, the controller 12 starts up all the load devices with the received power. Thereby, all the load devices can be started early.

(3) The controller 12 executes the processing of S21 of determining (an example of second power amount determination processing) whether the second power amount W2 is equal to or greater than the second startup power amount SW2 less than the first startup power amount SW1 required to start the display device 20, the image forming unit 16, and the like. If the controller 12 determines that the second power amount W2 is equal to or greater than the second startup power amount SW2 by the processing of S21 (S21: YES), the controller 12 starts up the display device 20 (S29).

According to this, the controller 12 starts up the display device 20 with priority when the power of the first startup power amount SW1 required to start up all the load devices cannot be received. Thereby, when the second power amount W2 is less than the first startup power amount SW1, the display device 20 can be started up earlier than other load devices such as the image forming unit 16.

(4) The printer 10 includes the display device 20 as an example of the first load device. According to this, it is possible to allow the user to recognize at an early stage that power is being supplied from the PC 81 to the printer 10 by starting up the display device 20 with priority and letting the user recognize the change in the display state of the display device 20.

(5) The printer 10 includes the image forming unit 16 that performs image processing based on the image data 45 and the image processing circuit 28 (an example of an image processing unit) as an example of the second load device. According to this, the priority of the image forming unit 16 or the like that performs image processing can be lowered compared to the display device 20, and the display device 20 can be started up with priority.

(6) When the display device 20 is started up, the controller 12 causes the display device 20 to display the required power amount requested to the PC 81, the power amount that is the maximum power that PC 81 can supply, and power reception state information indicating the state of the printer 10 when receiving the required power amount (S29, FIG. 6).

According to this, it is possible to allow the user to recognize the state of power transfer and the state of the printer 10 due to the power transfer by displaying the required power amount or the like on the display device 20. Thereby, the user can execute an appropriate response by confirming the display content of the display device 20. For example, the charging time of the battery 30 can be shortened by increasing the required power amount. For example, it is possible to increase the amount of power that can be supplied to a desired power amount by removing another electronic device (power sink) connected to the PC 81 while confirming the amount of power that can be supplied.

(7) The power transmission path 29 includes the fourth power transmission path 29D that connects the controller 12 and the battery 30. The printer 10 includes the switch 61 that switches the connection between the first power transmission path 29A and the controller 12, and the connection between the fourth power transmission path 29D and the controller 12. The switch 61 is an electromagnetic open/close switch that connects the fourth power transmission path 29D to the controller 12 when power is supplied from the battery 30 and connects the second power transmission path 29B to the controller 12 when power is not supplied from the battery 30.

According to this, the switch 61 that is an electromagnetic open/close switch connects the battery 30 to the controller 12 while power is supplied from the battery 30. The switch 61 connects the USB connection unit 19 to the controller 12 when power is not supplied from the battery 30. As a result, when the PC 81 is connected to the printer 10 in a state where the remaining battery capacity low, the power supplied from the PC 81 can be automatically supplied to the controller 12.

(8) The controller 12 includes the communication processing unit 12A that executes a power request. In the processing of S17, the controller 12 starts up the communication processing unit 12A with priority in the processing units. According to this, the controller 12 starts up the communication processing unit 12A with priority without starting up all the processing units in a state of receiving the power of the first power amount W1. The communication processing unit 12A executes the power request to the PC 81 by being started up. As a result, the amount of power consumed by the controller 12 can be reduced by starting up only the necessary communication processing unit 12A.

(9) As the interface of the present application, the USB connection unit 19 that performs power transfer and communication by connection according to the universal serial bus (USB) standard can be adopted. The printer 10 having an interface capable of transferring power according to the USB PD standard or the like can execute a negotiation of the amount of power to be received with the PC 81 connected by USB connection. The controller 12 can request to increase the power amount from the first power amount W1 to the second power amount W2 by the negotiation. Therefore, in the printer 10 having the USB standard interface, it is extremely effective to request the second power amount W2 and start up the display device 20 early.

(10) The USB connection unit 19 is connected to the PC 81 as a communication device in a USB standard communication role. According to this, when connected to the controller 12, the USB connection unit 19 functions as a USB standard communication device and receives a predetermined amount of power (such as 2.5 W) from the controller 12 of the communication host. Thus, the controller 12 can be started up by the received power by functioning as a communication device and receiving the predetermined amount of power.

(4. Modification Example)

Needless to say, the present application is not limited to the above-described embodiment, and various modifications and changes can be made without departing from the spirit of the present disclosure. For example, the contents of the flowcharts illustrated in FIGS. 3 and 4 and the order of the processing are examples. For example, the controller 12 (communication processing unit 12A) confirms the second startup power amount SW2 in S21, starts up the display device 20 (S29), and then confirms the first startup power amount SW1 (S35). However, if the communication processing unit 12A first confirms the first startup power amount SW1 and can receive power equal to or greater than the first startup power amount SW1, the communication processing unit 12A may start up all of the display device 20 and the image forming unit 16. Here, if the controller 12 cannot receive the power amount equal to or greater than the first startup power amount SW1, the controller 12 may execute the processing after S21 and S25.

The controller 12 (communication processing unit 12A) displays all of the required power amount, the amount of power that can be supplied, and the power reception state information on the display device 20, but may display only at least one piece of information on the display device 20. The communication standard of the interface in the present application is not limited to the USB PD standard and may be another communication standard capable of transferring power. At least a part of the power controller 33 may be a controller having a function of controlling power transfer in conformity with the USB PD standard, a so-called PD controller.

In the above embodiment, at least a part of the controller 12 of the present application may be configured by dedicated hardware such as an application specific integrated circuit (ASIC). The controller 12 may be configured to operate by using, for example, software processing and hardware processing together. In the above embodiment, the portable printer 10 is employed as the information processing apparatus of the present application but is not limited thereto. For example, the information processing apparatus may be a portable scanner device or a fax device. For example, when the contents of the present application are applied to a scanner device, a scan engine including an imaging device such as a contact image sensor (CIS) or a charge coupled device (CCD) can be employed as the second load device of the present application. Alternatively, as the information processing apparatus, various electronic devices including the battery 30 such as a smartphone and a digital camera can be employed.

What is claimed is:

1. An information processing apparatus comprising:
   an interface;
   a first load device;
   a battery capable of supplying power to the first load device;
   a controller; and
   a plurality of power transmission paths including:
      a first power transmission path configured to connect the interface and the controller without going through the battery;
      a second power transmission path configured to connect the interface and the first load device without going through the battery; and
      a third power transmission path configured to connect the interface and the battery,
   wherein the controller is configured to:
      start up the controller with power supplied via the interface and the first power transmission path when receiving power having a first power amount from an external device via the interface;
      request a second power amount greater than the first power amount to the external device via the interface after starting up of the controller;
      determine whether it is possible to receive power supply of the second power amount from the external device via the interface after requesting the second power amount;
      in a case where it is determined that it is possible to receive power supply of the second power amount from the external device via the interface in the determination of receiving the power supply, supply power supplied from the external device via the interface to the first load device via the second power transmission path to start up the first load device when power having the second power amount is supplied from the external device via the interface as a result of the request for the second power amount; and
      in a case where it is not determined that it is possible to receive power supply of the second power amount from the external device via the interface in the determination of receiving the power supply, supply the power supplied from the external device via the interface to the battery via the third power transmission path.

2. The information processing apparatus according to claim 1, further comprising:
   a second load device,
   wherein the controller is configured to determine whether the second power amount is equal to or greater than a first startup power amount required to start both the first load device and the second load device, and
   in a case where the controller determines that the second power amount is equal to or greater than the first startup power amount in the determination whether the second power amount is equal to or greater than the first startup power amount, the controller starts up both the first load device and the second load device in the start up of the first load device.

3. The information processing apparatus according to claim 1, further comprising:
a second load device,
wherein the controller is configured to determine whether the second power amount is equal to or greater than a second startup power amount which is less than a first startup power amount required to start up both the first load device and the second load device, and
in a case where the controller determines that the second power amount is equal to or greater than the second startup power amount in the determination whether the second power amount is equal to or greater than the second startup power amount, the controller starts up the first load device in the start up of the first load device.

4. The information processing apparatus according to claim 1, wherein the first load device is a display device.

5. The information processing apparatus according to claim 2, wherein the second load device is an image processing unit performing image processing based on image data.

6. The information processing apparatus according to claim 1, wherein the first load device is a display device, and
in a case where the controller starts up the display device in the start up of the first load device, the controller is configured to control the display device to display at least one of:
a required power amount requested to the external device;
a suppliable power amount that is a maximum amount of power suppliable by the external device; and
power reception state information indicating a state of the information processing apparatus when receiving the required power amount.

7. The information processing apparatus according to claim 1, wherein the plurality of power transmission paths includes a fourth power transmission path configured to connect the controller and the battery,
the information processing apparatus further comprises a switch device switching connection between the first power transmission path and the controller, and connection between the fourth power transmission path and the controller, and
the switch device is an electromagnetic open/close switch connecting the fourth power transmission path to the controller when power is supplied from the battery and connects the second power transmission path to the controller when power is not supplied from the battery.

8. The information processing apparatus according to claim 1, wherein the controller includes a plurality of processing units,
the plurality of processing units include a communication processing unit configured to request the second power amount, and
the controller is configured to start up the communication processing unit with priority in the plurality of processing units in the start up of the controller.

9. The information processing apparatus according to claim 1, wherein the interface is an interface for performing power transfer and communication with connection in conformity with to a universal serial bus (USB) standard.

10. The information processing apparatus according to claim 9, wherein when the interface performs a communication in conformity with the universal serial bus (USB) standard with the controller, the interface is connected to the controller as a communication device in a communication role of the universal serial bus (USB) standard.

11. A control method of an information processing apparatus including an interface, a first load device, a battery capable of supplying power to the first load device, a controller, and a plurality of power transmission paths including a first power transmission path configured to connect the interface and the controller without going through the battery, a second power transmission path configured to connect the interface and the first load device without going through the battery, and a third power transmission path configured to connect the interface and the battery, the method comprising:
starting up the controller with power supplied via the interface and the first power transmission path when receiving power having a first power amount from an external device via the interface;
requesting a second power amount greater than the first power amount to the external device via the interface after starting up the controller;
determining whether it is possible to receive power supply of the second power amount from the external device via the interface after requesting the second power amount;
in a case where it is determined that it is possible to receive the power supply of the second power amount from the external device via the interface in the determination of receiving the second power amount, supplying power supplied from the external device via the interface to the first load device via the second power transmission path to start up the first load device when power having the second power amount is supplied from the external device via the interface as a result of requesting the second power amount; and
in a case where it is not determined that it is possible to receive the power supply of the second power amount from the external device via the interface in the determination of receiving the second power amount, supplying the power supplied from the external device via the interface to the battery via the third power transmission path.

12. The control method according to claim 11, wherein the information processing apparatus further includes a second load device,
wherein the method further comprises:
determining whether the second power amount is equal to or greater than a first startup power amount required to start both the first load device and the second load device, and
in a case where it is determined that the second power amount is equal to or greater than the first startup power amount in the determination whether the second power amount is equal to or greater than the first startup power amount, starting up both the first load device and the second load device in the start up of the first load device.

13. The control method according to claim 11, wherein the information processing apparatus further includes a second load device,
wherein the method further comprises:
determining whether the second power amount is equal to or greater than a second startup power amount which is less than a first startup power amount required to start up both the first load device and the second load device, and
in a case where it is determined that the second power amount is equal to or greater than the second startup power amount in the determination whether the second power amount is equal to or greater than the second startup power amount, starting up the first load device in the start up of the first load device.

14. The control method according to claim 11, wherein the first load device is a display device.

15. The control method according to claim 12, wherein the second load device is an image processing unit performing image processing based on image data.

16. A non-transitory computer readable medium storing a program causing a computer to execute a process for controlling an information processing apparatus including an interface, a first load device, a battery capable of supplying power to the first load device, a controller, and a plurality of power transmission paths including a first power transmission path configured to connect the interface and the controller without going through the battery, a second power transmission path configured to connect the interface and the first load device without going through the battery, and a third power transmission path configured to connect the interface and the battery, the process comprising:
  starting up the controller with power supplied via the interface and the first power transmission path when receiving power having a first power amount from an external device via the interface;
  requesting a second power amount greater than the first power amount to the external device via the interface after starting up the controller;
  determining whether it is possible to receive power supply of the second power amount from the external device via the interface after requesting the second power amount;
  in a case where it is determined that it is possible to receive power supply of the second power amount from the external device via the interface in the determination of receiving the second power amount, supplying power supplied from the external device via the interface to the first load device via the second power transmission path to start up the first load device when power having the second power amount is supplied from the external device via the interface as a result of requesting the second power amount; and
  in a case where it is not determined that it is possible to receive power supply of the second power amount from the external device via the interface in the determination of receiving the second power amount, supplying the power supplied from the external device via the interface to the battery via the third power transmission path.

17. The non-transitory computer readable medium according to claim 16, wherein the information processing apparatus further includes a second load device,
  wherein the process further comprises:
    determining whether the second power amount is equal to or greater than a first startup power amount required to start both the first load device and the second load device, and
    in a case where it is determined that the second power amount is equal to or greater than the first startup power amount in the determination whether the second power amount is equal to or greater than the first startup power amount, starting up both the first load device and the second load device in the start up of the first load device.

18. The non-transitory computer readable medium according to claim 16, wherein the information processing apparatus further includes a second load device,
  wherein the process further comprises:
    determining whether the second power amount is equal to or greater than a second startup power amount which is less than a first startup power amount required to start up both the first load device and the second load device, and
    in a case where it is determined that the second power amount is equal to or greater than the second startup power amount in the determination whether the second power amount is equal to or greater than the second startup power amount, starting up the first load device in the start up of the first load device.

19. The non-transitory computer readable medium according to claim 16, wherein the first load device is a display device.

20. The non-transitory computer readable medium according to claim 17, wherein the second load device is an image processing unit performing image processing based on image data.

* * * * *